(12) United States Patent
Stearns et al.

(10) Patent No.: US 8,010,300 B1
(45) Date of Patent: Aug. 30, 2011

(54) DETERMINATION OF GAS FLUX USING AIRBORNE DIAL LIDAR

(75) Inventors: Steven Vincent Stearns, Pittsford, NY (US); Joseph Lawrence Lippert, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 306 days.

(21) Appl. No.: 12/276,686

(22) Filed: Nov. 24, 2008

(51) Int. Cl.
*G01S 17/00* (2006.01)

(52) U.S. Cl. ............................ 702/24; 356/326; 356/437

(58) Field of Classification Search .................... 702/23, 702/24
See application file for complete search history.

(56) References Cited

U.S. PATENT DOCUMENTS

| | | |
|---|---|---|
| 4,001,764 A | 1/1977 | Holland et al. |
| 4,450,356 A | 5/1984 | Murray et al. |
| 4,489,239 A | 12/1984 | Grant et al. |
| 4,870,275 A | 9/1989 | Ozdemir et al. |
| 4,871,916 A | 10/1989 | Scott |
| 5,166,789 A | 11/1992 | Myrick |
| 5,250,810 A | 10/1993 | Geiger |
| 5,410,154 A | 4/1995 | Broicher et al. |
| 5,481,476 A | 1/1996 | Windig |
| 5,818,951 A | 10/1998 | Schivley |
| 6,366,681 B1 | 4/2002 | Hutchins |
| 6,509,566 B1 | 1/2003 | Wamsley et al. |
| 6,646,725 B1 | 11/2003 | Eichinger et al. |
| 6,725,705 B1 | 4/2004 | Huebler et al. |
| 6,822,742 B1 | 11/2004 | Kalayeh et al. |
| 6,864,983 B2 * | 3/2005 | Galle et al. ..................... 356/437 |
| 2003/0009268 A1 | 1/2003 | Inokuchi |
| 2003/0030001 A1 | 2/2003 | Cooper |
| 2005/0010365 A1 | 1/2005 | Chapman et al. |
| 2007/0061114 A1 | 3/2007 | Kalayeh |
| 2007/0069941 A1 | 3/2007 | Pearlman et al. |
| 2008/0195329 A1 * | 8/2008 | Prince et al. ..................... 702/23 |
| 2008/0210881 A1 | 9/2008 | Harris et al. |
| 2010/0091267 A1 * | 4/2010 | Wong ............................... 356/51 |

FOREIGN PATENT DOCUMENTS

| | | |
|---|---|---|
| CA | 2655279 | 5/2009 |
| EP | 0 489 546 A | 6/1992 |
| WO | WO 2005/064316 A1 | 7/2005 |

OTHER PUBLICATIONS

P.G. Hall et al., NOAA Technical Memorandum, ARL-257, Air Resources Laboratory, Tennessee, 2006.*
Werner Zirnig and Matthias Ulbricht, "Innovative Technologies Improve Environmental Protection—Detection of Gas Leaks by Helicopter-Borne Infrared Laser System".
Egor V. Degtiarev, Allen R. Geiger and Richard D. Richmond, "Compact mid-infrared DIAL lidar for ground-based and airborne pipeline monitoring". Remote sensing of Clouds and the Atmosphere VII, Klaus Schafer, Olga Lado-Bordowsky, Adolfo Comeron, Richard H. Picards, Editors. Proceedings of SPIE, vol. 4882, 2003.
S. Brunsgaard, R. W. Berg and E. H. Stenby, "High-Pressure Measuring Cell for Raman Spectroscopic Studies of Natural Gas", Applied Spectroscopy, vol. 55, No. 1, 2001, pp. 55-60.
Wong, Colin, U.S. Appl. No. 61/136,837, Non-Point Source Fugitive Emission Flux Measurement, filed Oct. 8, 2008 .
Office Action of U.S. Appl. No. 12/639,364, Dated Feb. 24, 2011.
European Search Report mailed on Apr. 13, 2011, in related European Patent Application No. EP 10194444.5.

* cited by examiner

*Primary Examiner* — Eliseo Ramos Feliciano
*Assistant Examiner* — Alexander Satanovsky
(74) *Attorney, Agent, or Firm* — RatnerPrestia (57) ABSTRACT

A system is provided for determining emission rate of a gas from a source. The system includes a selector for designating an in-plume area extending across a plume of gas. The in-plume area includes a length dimension greater than a width dimension. The system also includes a processor for determining an area-integrated concentration value for the in-plume area. The system further includes a wind vector received by the processor. The processor determines the emission rate of the gas based on the area-integrated concentration value and a vector component of the wind vector.

16 Claims, 4 Drawing Sheets

DETERMINATION OF GAS FLUX USING AIRBORNE DIAL LIDAR

FIELD OF THE INVENTION

The invention relates generally to the field of spectroscopic analysis. More specifically, the invention relates to a spectroscopic analysis of gases emanating from natural gas and oil pipelines and determination of gas flux using laser differential absorption, wind speed and wind direction.

BACKGROUND OF THE INVENTION

Technologies available for the rate quantification of gas(es) emitted from a point source such as a smokestack or a leaking pipeline are numerous and well understood. These techniques include use of rotameters or hot-wire anemometers to measure the velocity of gasses escaping from a hole of known size. Also included are more high tech devices like the Hi-Flow sampler which is an instrument that combines a hydrocarbon detector with a flowmeter and vacuum system.

Measurement of emission flux from larger, more complex non-point sources of emissions may be accomplished by numerical calculations within the facility (for example, estimating based on amount of material lost), by direct point-sampling of the gas plume downwind of the source, or (most recently) by use of path integrated optical remote sensing. Non-point-source emissions of gasses like methane and other volatile organic carbons (VOCs) are numerous and variable and include refineries, industrial complexes, sewage systems, tank farms, landfills, agricultural sites, coal mines, oil and gas exploration and production sites and pipeline networks. Measuring the emissions from these types of sites is made more difficult by the fact that exact sources of emission are not always known.

There are several optical technologies available to quantify the gasses emitted from non-point sources. These optical technologies include Open-Path Fourier Transform InfraRed Spectroscopy (OP-FTIR), Ultra-Violet Differential Optical Absorption Spectroscopy (UV-DOAS), Tunable Diode Laser Spectroscopy (TDLAS), and Path Integrated Differential Absorption Lidar (PI-DIAL). These optical remote sensing technologies are all ground based, active optical instruments which pass light through a plume of gas and measure a path-integrated concentration of gas in the plume by detecting changes in light passing through the gas plume. Further, these technologies rely on one or more retro-reflectors or separate light sources and detectors on either side of the gas plume.

Measurement approaches include horizontal plume mapping, vertical plume mapping and one-dimensional "fence-line" mapping downwind of a plume. Another measurement technique is Solar Occultation Flux (SOF) which uses IR and the sun as an optical source from a fixed or moving ground-based platform. Combining path-integrated gas measurements with measurements of wind speed and direction allows calculation of the amount of gas emitted from a location over time (flux).

SUMMARY OF THE INVENTION

The present invention provides a system for determining emission rate of a gas from a source. The system includes a selector for designating an in-plume area extending across a plume of gas. The in-plume area includes a length dimension greater than a width dimension. The system also includes a processor for determining an area-integrated concentration value for the in-plume area. The system further includes a wind vector received by the processor. The processor determines the emission rate of the gas based on the area-integrated concentration value and a vector component of the wind vector.

The present invention further provides a system for determining flux of a gas plume. The system includes a differential absorption LIDAR (DIAL) for determining a plurality of concentration path length (CPL) measurements. The system also includes a selector for designating an in-plume area extending across the plume of gas. The in-plume area includes length and width dimensions and a portion of the CPL measurements. The system further includes a processor for averaging the portion of the CPL measurements to obtain an in-plume CPL average value. The processor determines the flux of the gas plume by multiplying the in-plume CPL average value with the length dimension and a wind vector perpendicular to the length dimension.

The present invention further provides a method for determining flux of a gas plume. The method includes determining a plurality of concentration path length (CPL) measurements from an aircraft. The method also includes enclosing a portion of the CPL measurements with a parallelogram. The parallelogram includes an in-plume area having a length dimension and a width dimension. The method also includes obtaining an in-plume area-integrated concentration (AIC) value from the plurality of CPL measurements and determining a wind vector perpendicular to the length dimension. The method further includes multiplying the in-plume AIC value with the wind vector perpendicular to the length dimension to determine the flux of the gas plume.

DETAILED DESCRIPTION OF THE INVENTION

Many of the conventional techniques for measurement of gaseous emission are ground-based and require long term (several days) access to sites and unobstructed optical paths down-wind of the emission source(s). Remote or hard to access sites are difficult and expensive to measure. In addition, measurements are time consuming and take days or weeks to complete as an operator waits for the right wind conditions to direct a plume to a designated optical measurement path.

Because shifts in wind speed and direction result in an ever-changing plume of gas from a site, combining instrument readings from different optical paths over a period of time results in inaccurate flux calculations. Instruments like the SOF, which rely on the sun as an illumination source, require low cloud cover and high sun angle to produce sufficient light for usable measurements. In addition, using the SOF requires access to the site and a drivable road some distance downwind of the gas source.

These techniques only allow a partial optical view of ground-hugging plumes, since the instruments are mounted on the tops or sides of vehicles and cannot make measurements fully extending to ground level. Further, these techniques only allow a near instantaneous (a few seconds at most) snapshot of an entire plume cross section by using a single non-average wind speed and direction when calculating flux.

Accurate wind measurement is a major source of error for these techniques because the wind is constantly shifting. As a result, pre-positioning retro-reflectors and optical detectors to provide usable flux calculation is largely guesswork and frequently requires subsequent deployment of more ground equipment. These techniques also require access of a truck or vehicle to the site, which typically has to be shipped in from overseas. Because of their complexity and time consumption, the cost of using these technologies is high. Only a handful of sites may be measured a year.

The present invention, on the other hand, uses instrumentation mounted in a fixed wing aircraft flying hundreds of feet above the gas plume. An example of such instrumentation is the DIAL (differential absorption LIDAR) system, also referred to as the ANGEL system. The ANGEL system is described in U.S. Pat. No. 6,822,742, which is incorporated herein in its entirety.

Briefly, the ANGEL system includes a sensor for remote quantitative detection of fluid leaks from a natural gas or oil pipeline by use of an airborne platform. The system includes a laser light source for illuminating an area of target gases and background. The target gases may be characterized by one or more absorption wavelengths (also referred to as on-line). The background may be detected at a wavelength (also referred to as off-line) different from the target gases.

For example, the ANGEL system may use a 3-line tunable DIAL laser system for measuring the concentration pathlengths (CPL) of two selected target gases. When the airborne platform reaches a target location, laser beams are automatically pointed to the target location for scanning the surrounding regions. The returned laser beams are analyzed to develop two-dimensional gas-maps or images of gases, such as methane and ethane in units of CPL.

In a 2-line tunable DIAL laser system, two single-wavelength, laser pulses are transmitted. One laser pulse of a specific wavelength is chosen which is absorbed by the gas of interest, and the other laser pulse, chosen at a different wavelength, is not absorbed. The energy reflected back to the sensor for both wavelengths is measured to generate an estimate of the target CPL. The energy reflected back to the sensor is described by the following relationship, $$E \propto \frac{E_T \rho_\pi \exp[-2(CL_p + C_{bg}R)\sigma(\lambda)]}{R^2},$$

where $E_T$ is the transmitted energy, $\rho_\pi$ is the surface reflectance, $CL_p$ is the concentration-length product of the gas, $C_{bg}$ is the background concentration of the gas, R is the range to the surface, and $\sigma(\lambda)$ is the absorption cross-section of the gas as a function of wavelength.

Figure 1:
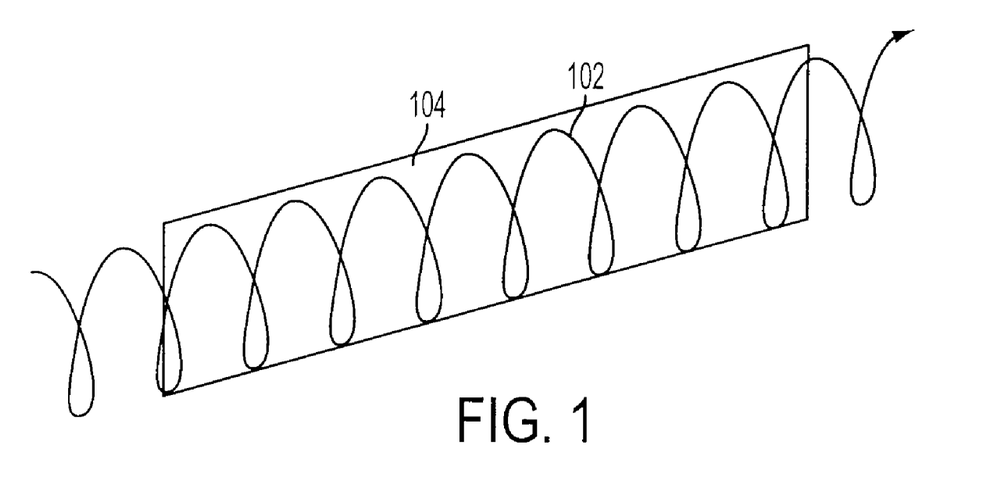
FIG. 1 is an exemplary illustration showing a laser conical scan illumination of a is target area.
Figure 2:
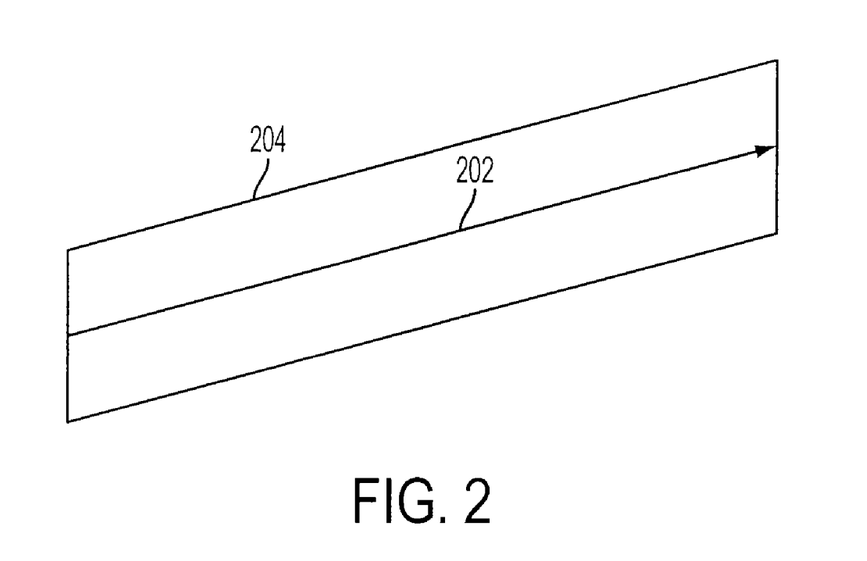
FIG. 2 is a an exemplary illustration showing a laser straight line scan illumination of a target area.

As shown in FIG. 1, laser light 102 transmitted from the ANGEL system illuminates target area 104 using a conical scan (scanner-on mode). Alternatively, laser light 202 transmitted from the ANGEL system may illuminate target area 204 in a straight line (scanner-off mode), as shown in FIG. 2. Both modes may be used by the present invention.

With the exception of deploying lightweight wind sensor instrumentation, the ANGEL system does not need to enter a site to make measurements. The system may fly at high speeds (i.e. 120 mph) and measure large plumes in seconds, in effect providing a snapshot of the plume in time. As a result, measurements taken by the ANGEL system are more accurate than other systems which attempt to quantify a moving plume in several pieces.

For example, at a flight speed of 120 mph and a transmission rate of 1,000 pulses/second, the pulses are spaced about 2 inches apart providing a "curtain" of gas measurements to fully capture a cross section of the plume. Because the laser light from the ANGEL system reflects off the ground surface, the entire height of the plume is measured all the way down to the ground, thereby resulting in a more accurate measurement. Because measurements are collected so rapidly, the wind direction may be factored into the data collection and the pilot may fly downwind of the site and have a higher likelihood of acquiring a cross section of the plume perpendicular to the wind direction. Further, because the ANGEL system collects data rapidly while airborne, multiple sites may be measured in a single day, much more efficiently than ground-based technologies.

According to an exemplary embodiment of the invention, the emission rate or flux may be determined from a gas source, such as methane, by flying down-wind and across the plume while measuring gas concentration (CPL or concentration×pathlength) from the airplane to the ground using an airborne measurement system, such as the ANGEL system, that has sufficient spatial density to map the cross-plume path concentration profile. The exemplary embodiments, however, are not limited to the measurements of methane. Any other gas may be measured in a similar manner.

Figure 3:
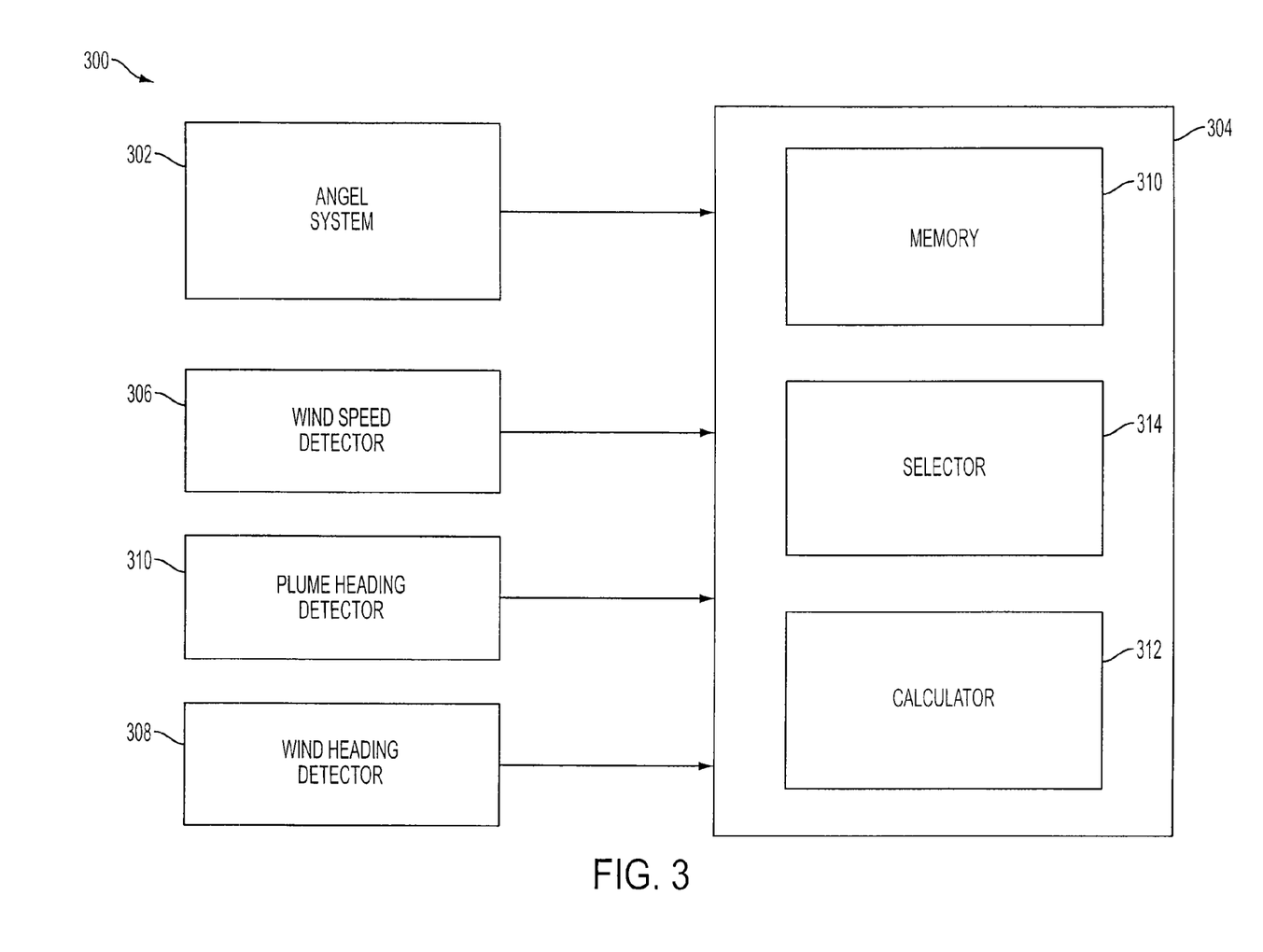
FIG. 3 is a block diagram of a system for determining emission rate of a gas according to an exemplary embodiment of the present invention.

Referring next to FIG. 3, the present invention is exemplified in system 300 for determining the emission rate or flux of a gas source. The system 300 includes ANGEL system 302 and processor 304. The processor 304 may be hard wired to ANGEL system 302 or wirelessly linked to ANGEL system 302. Further, processor 304 may be disposed in close proximity to ANGEL system 302 or remotely from ANGEL system 302.

The system 300 also includes wind detector 306 and plume heading detector 308 for measuring wind speed and wind heading (direction) with respect to the gas plume. The wind speed and heading may be measured by local weather stations in the area. That is, the wind speed and heading may be measured remotely from the gas plume. Alternatively, wind measurements may be measured in close proximity to the gas plume.

As shown in FIG. 3, processor 304 includes memory 310 for storing data provided from ANGEL system 302, wind detector 306 and plume heading detector 308. The processor 304 also includes a selector 314 for designating an in-plume area extending across a plume of gas and including a length dimension greater than a width dimension. The processor 304 further includes a calculator 312 for calculating the emission rate or flux of the gas plume from the data stored in memory 310.

Figures 4A, 4B:
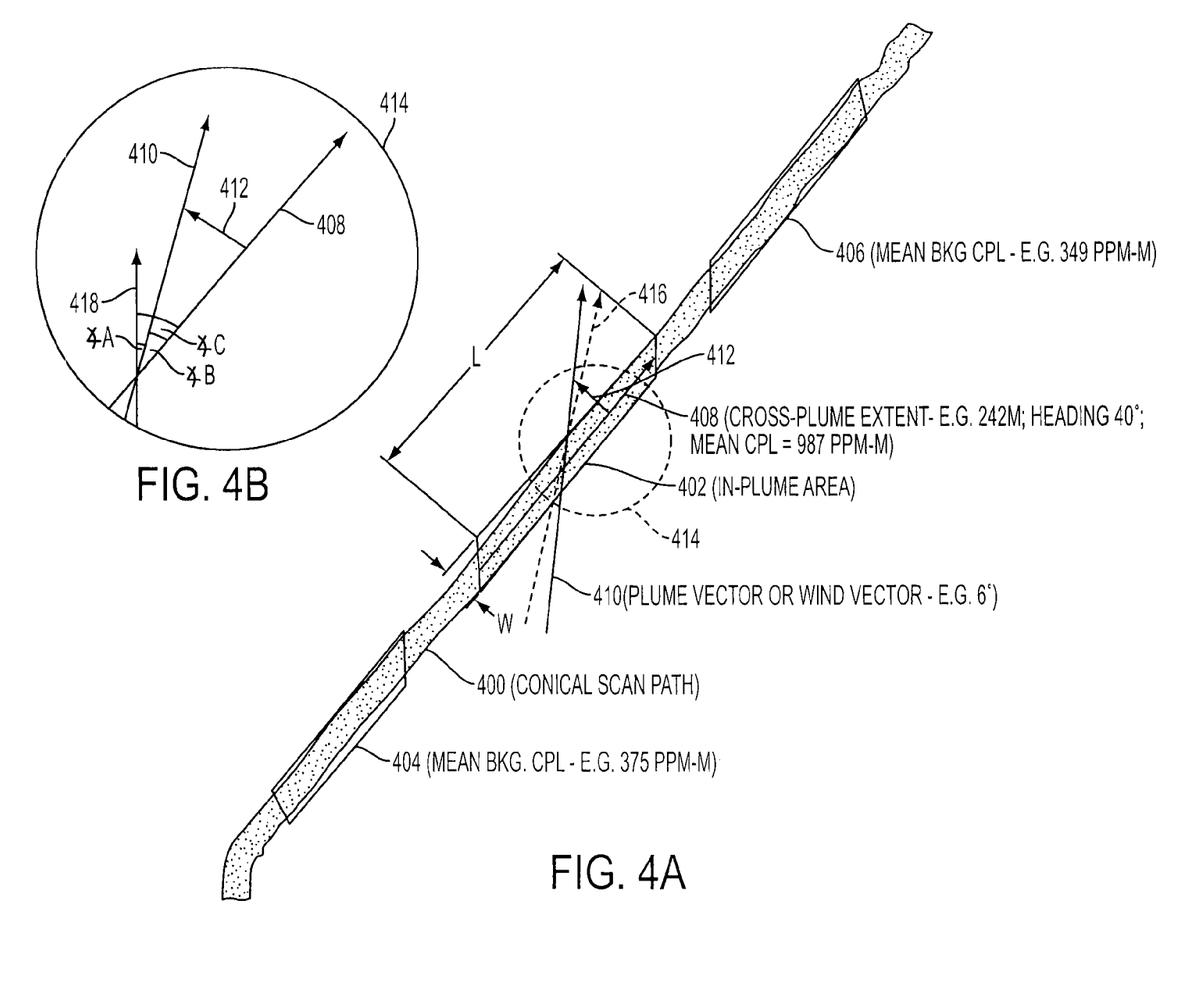
FIG. 4A is an exemplary top view of the path of a laser conical scan illumination.
FIG. 4B is an exploded view of area 414 shown in FIG. 4A.

FIG. 4A is a top view of a path of a conically scanned laser light transmitted from the ANGEL system. As shown, conical scan path 400 traverses in-plume area 402 having a length dimension L greater than a width dimension W. Conical scan path 400 also traverses first area 404 adjacent to in-plume area 402 and second area 406 adjacent to in-plume area 402. The direction of cross plume extent 408 (the heading in which the cross-plume distance is measured) within in-plume area 402, plume heading 410 and vector 412, which is perpendicular to cross-plume extent 408, are also shown.

In operation, as conical scan path 400 traverses in-plume area 402 and adjacent background areas 404, 406, ANGEL system 302 determines a plurality of CPL measurements for in-plume area 402 and both adjacent background areas 404, 406. The CPL measurements include vertical CPL measurements in vertical paths from the airborne platform to the in-plume area 402 and adjacent background areas 404, 406. The plurality of CPL measurements are provided to processor 304 and stored in memory 310.

Selector 314 designates in-plume area 402 extending across a plume of gas. A area-integrated CPL concentration (AIC) value for in-plume area 402 may then be determined by calculator 312. The AIC value for in-plume area 402, however, may be determined in different ways. For example, plurality of CPL measurements for in-plume area 402 may be integrated across the plume by calculator 312 to produce the AIC value ($\int_{cross\text{-}plume} (CPL_{vertical}) \, dL$) covering the entire length L and height of the plume. That is, the AIC value for in plume area 402 may be determined as ($\int_{cross\text{-}plume} (CPL_{vertical}) \, dL$), which is shown below in Equation 1.

In practice, however, it may be easier to obtain the AIC value by averaging the plurality of CPL measurements for in-plume area 402 across the plume, producing an in-plume CPL average value, and multiplying the in-plume CPL average value by the length L of in-plume area 402. That is, the AIC value for in plume area 402 may also be determined as an average across the plume ($Avg(CPL_{vertical}) \times L_{cross\text{-}plume}$), as shown below in Equation 2.

It is general practice to assume that the wind is the determining factor that carries a plume of gas downwind from its source. Accordingly, wind speed and heading may be used with AIC value for in-plume area 402 to determine the emission rate of a gas. Wind speed and heading combine to provide a wind vector, received by processor 304. The wind vector may be determined from wind speed ($v_{wind}$) and wind heading (heading$_{wind}$). The wind vector may also be determined from wind speed and plume heading. For example, the wind heading may be the same as the plume heading. Thus, plume heading 410 and wind heading 410 are both shown by the same arrow in FIG. 4A.

Wind heading, however, may not be the same as plume heading. If wind heading and plume heading are different, wind heading may either be plume heading 410 (direction of the plume), provided by plume heading detector 310 or wind heading (shown as dotted arrow 416), provided by wind heading detector 308. If plume heading 410 and wind heading 412 are different, it may be more desirable to use plume heading 410. It may also be desirable to not use the calculation if the difference between plume heading 410 and average wind heading 412 is greater than a predetermined threshold.

The measured wind speed ($v_{wind}$) and wind heading (heading$_{wind}$) may be provided to processor 304 from a single weather station or multiple weather stations in the vicinity of in-plume area 402. For example, the measured wind speed provided to processor 304 may be an average wind speed averaged from multiple weather stations (i.e. 7-11 mph and 0-8 mph) and wind heading may be an average of wind headings from multiple weather stations (i.e. S-SSW=0-15° and SSW=15°).

According to one exemplary embodiment, multiple calculations may be used to determine the emission rate. For example, a first calculation may use the lowest wind speed and heading. A second calculation may use the highest wind speed and heading. A third calculation may use the average wind speed and heading.

The wind measurements may be detected by wind detector 306 in close proximity to the gas plume without using data from weather stations in the area. That is, with reference to FIG. 4, the measured wind speed and heading provided to processor 304 may be determined in close proximity to in-plume area 402.

The wind vector may be resolved into a vector 412, which is perpendicular to cross-plume extent 408 (or perpendicular to the length dimension L of in-plume area 402). The vector 412 is calculated by the term $v_{wind} \times \sin(heading_{cross\text{-}plume} - heading_{wind})$, shown below in equations 1 and 2.

FIG. 4B is an exploded view of section 414 shown in FIG. 4A, illustrating the terms used in equations 1 and 2 for calculating vector 412. As shown, vector 412 is a vector component of wind vector 410. Heading 418 represents a reference heading (e.g. zero degrees). With reference to FIG. 4B, the terms "heading$_{cross\text{-}plume}$–heading$_{wind}$" may be shown as "angle C–angle A," equaling angle B. The sine component of vector 410 provides vector 412 which is perpendicular to cross-plume extent 408.

The processor may determine an emission rate of the gas based on an AIC value and a vector component of the wind vector. The total flux or emission rate across the measured in-plume area (W×L) may be calculated by calculator 312 as a product of the AIC value and wind speed vector 412, as follows:

$$\text{Emission Rate} = (\int_{cross\text{-}plume}(CPL_{vertical})dL) \times v_{wind} \times \sin(heading_{cross\text{-}plume} - heading_{wind}), \quad (1)$$

where $v_{wind}$ is the measured wind speed, heading$_{cross\text{-}plume}$ is the direction of cross plume extent 408 (the heading in which the cross-plume length L is measured) and dL is the length differential.

In addition, it may be easier to average the vertical CPL across the plume and multiply by the cross-plume length L to produce the same result as a direct integration or a summation across the plume. Therefore, the emission rate across the measured area may be calculated by calculator 312 using the following equation 2:

$$\text{Emission Rate} = (Avg(CPL_{vertical})) \times L_{cross\text{-}plume} \times v_{wind} \times \sin(heading_{cross\text{-}plume} - heading_{wind}), \quad (2)$$

where $Avg(CPL_{vertical})$ is the in-plume CPL average along cross-plume extent 408 within in-plume area 402 and $L_{cross\text{-}plume}$ is the length of cross plume extent 408 (the length across the plume for which in-plume CPL is measured).

According to one exemplary embodiment, the vertical CPL measurements may include vertical CPL measurements obtained in an area adjacent to in-plume area 402. For example, the vertical CPL measurements may include background vertical CPL measurements obtained in first area 404 adjacent to in-plume area 402. Accordingly, processor 304 may determine an in-plume CPL average value ($Avg(CPL_{vertical})$) by subtracting the average of the background vertical CPL measurements in the first area 404 from the average of the vertical CPL measurements in the in-plume area 402.

In addition, the vertical CPL measurements may include vertical CPL measurements obtained in a plurality of areas adjacent to in-plume area 402. For example, the vertical CPL measurements may include background vertical CPL measurements obtained in first area 404 and second area 406 adjacent to in-plume area 402. Accordingly, processor 304 may determine an in-plume CPL average value (Avg (CPL$_{vertical}$)) by subtracting the average of the background vertical CPL measurements in the first area 404 and second area 406 from the average of the vertical CPL measurements in the in-plume area 402.

The following examples use the exemplary embodiment described above to determine estimates of methane flux from three uncontrolled releases or leaks that were observed during the course of ANGEL service operations. One of these releases was downwind of a purge of a newly drilled natural gas well and the other two were downwind of natural gas facilities.

In all three examples, the releases were of unknown sizes. Further, the nearest weather information was from weather stations 14-30 miles from the location of the releases, which only reported every hour. Therefore, the methane flux results may only be considered reasonable estimates or bounds for the actual methane flux. These examples show that it is possible to estimate methane flux for an unstaged, diffuse release that includes reasonable wind speed and direction.

Example (1)

Methane Flux from Purge of a Drilled Natural Gas Well

During an ANGEL service mission in western New York State, an area of high CPL was observed during a short purge of a drilled natural gas well in order to clear the well of water and debris. Typically, the plume heading observed in the ANGEL data is a better representation of the actual local wind direction that carried the plume than are values obtained from weather stations that are not at the leak location. The emission rate of methane calculated using equation 2, was between 25,400 SCFH (standard cubic feet per hour), obtained from the lowest wind speed and highest wind direction, and 60,700 SCFH, obtained from the highest wind speed and lowest wind direction. Using the plume heading and an average wind speed gives an intermediate methane flux of 43,000 SCFH.

The following values were used to calculate the emission rate of methane:

Avg(CPL$_{vertical}$)=625 ppm-m, which is the in-plume CPL average (987 ppm-m)–the average of the CPLs in the two adjacent background areas (($^{349}$⁄$_2$+$^{375}$⁄$_2$) ppm-m), (see values in FIG. 4A), L$_{cross-plume}$=242 m, which is the length across the plume for which in-plume CPL average was measured, V$_{wind}$=7-11 mph, which is the measured wind speed, heading$_{cross-plume}$=40 degrees, which is the cross-plume heading, and heading$_{wind}$=6 degrees, which is the wind heading. It is contemplated that the average wind heading at a weather station (0-15 Deg) may also be used as the wind heading.

The wind direction and speed are the largest variables in flux determination. These variables represent reasonable bounds for estimates of methane flux when there is a lack of local meterological data.

Example (2)

Methane Flux from a Diffuse Location Downwind of Facility in the Midwest US

Example 2 includes a mission flown downwind of a natural gas facility in the US Midwest. In this example, winds at the nearest weather station (about 20 miles away) were 5.8 mph from the WNW (120 Deg heading), while the plume direction was determined to be approximately 132 degrees. The cross-plume or flight heading was 8 degrees. The CPL average was measured to be 985 ppm-m across 48 m. Therefore, the methane flux was determined to be between 12,900 SCFH and 14,400 SCFH.

Example (3)

Methane Flux from a Diffuse Indication Downwind of a Facility in the Southern US Example 2 includes a mission flown downwind of a natural gas facility in the Southern US. In this example, winds at the nearest weather station were reported as 9.2 mph from the ESE (300 degree heading), while the plume direction was determined to be approximately 330 degrees. The cross-plume or aircraft heading was 100 degrees. The CPL average was measured to be 570 ppm-m across 95 m. Therefore, the methane flux was determined to be between 8,700 SCFH and 19,400 SCFH. The larger variation in this example is associated with the substantial difference between reported wind heading (not local) and apparent plume heading.

The above three examples provide evidence of the ability to quantify methane flux or leak rate from a variety of non-staged releases observed in the course of normal ANGEL leak detection missions.

Example (4)

Process for Determining Methane Release Rate Using Software

According to an exemplary embodiment of the invention, software may be used to determine methane flux. Calculator 312, shown at FIG. 3, may be used to execute the software. This example utilizes data processed from the ANGEL system flown at approximately 220 m AGL, to provide ground geolocated, CPL values at a measurement rate of 1 kHz. Thus, for an aircraft flying at 120 mph, the CPL measurements are an average of 0.056 m (5.6 cm) apart in the flight direction. The ANGEL system illuminates a ground spot of approximately 1 m diameter so adjacent measurements are overlapped.

Because of the overlapping measurements, high spatial density is not required but is useful for data averaging purposes in order to improve accuracy. The data may be output in different formats. This example uses output produced in ESRI ArcMap format, along with an ArcMap program. Other programs may also be used. For example, the determination of emission rate may be done using Excel-based data.

The ANGEL system flew multiple flights over a calibrated methane emission set of 500 SCFH. The emission flowed at that rate during multiple passes. In some passes, the system was set to a scanner angle of zero so that the swath width was zero and the passes were downwind of the gas release. In other passes, the system was set to provide a conical scan pattern with a ground swath width of approximately 30 m, and the center of the swath to coincide with the release point.

The following steps were used to determine the methane flux. ESRI ArcMap software was used, as an example.

1) Display the shapefile produced by analysis over a visible geolocated image. The shapefile contains the location of each laser spot on the ground and a measurement of the CPL at each location.

2) Use a quantities function to colorize CPL. For example, define filter colors that correspond to a range of CPL. Blue locations may correspond to CPLs of 750 ppm-m above the mean CPL for a pass. Red locations may correspond to CPLs in the range of 300 ppm-m to 500 ppm-m and orange locations may correspond to CPLs in the range of 500 ppm-m to 750 ppm-m. Winds were measured with a portable ground station at ground level near the release point. The winds were measured as 1 mph from the North (180 degrees) for one pass. It is important to recognize that for a fixed wind speed and direction, the flux crossing any location along the plume is likely to be identical for a continuous source. Therefore, any cross-plume location where the CPL is above the background CPL may be used for measurement. If the measurements are averaged over multiple (full-width) in-plume locations, the data is less noisy.

3) If appropriate, use a 'Measure\Angle' tool to measure the heading of the plume. In this case, the plume heading was 126 deg whereas the wind direction was measured by the ground station to be 180 deg. Typical differences between these measurements may lead to flux differences of 10-30%.

4) Select 'polygon drawing tool' (in the Drawing Toolbar) and draw a polygon (typically a rectangle or parallelepiped) around a complete cross-section of the plume. The polygon may be perpendicular to the plume or wind direction or parallel to the flight direction. Determine and use the heading of the cross-section in concert with the wind or plume heading. Be sure not to include points so near the source that their flux may be generated by the release, rather than the wind.

5) Select all the points within the polygon.

6) Right Click the Active Shapefile and 'Open Attribute Table.

7) At the bottom of the Attribute Table screen select 'Show Selected'. At that point all the attributes of the selected points will have a green background. It will be necessary to unselect points that are rejected by data processing (i.e. those rejected by a filter, such as FilterNo <20). Right click the grey box to the left of the row for each point on the Attribute Table with the filter (i.e. FilterNo <20) rejecting the points and select 'Unselect'.

8) Use the 'Selection' drop-down to click 'SStatistics'. In the Selection Statistics Box, Use the 'Field' drop-down to choose the 'CPLAvg' field. Write down the mean value. This is the CPL average in the plume cross-section, including any background values.

9) Close the 'Selection Statistics Box'.

10) Use the 'Measure\Angle Tool' to measure the heading and cross-section length of the selected cross-section. In the current example the cross-section length is 12.0 m and the heading is 68 deg.

11) Use the polygon tool to select a representative group of greater than 100 points on one side of the plume. As before, 'Select by Graphics' under the 'Selection' dropdown. Note that the points in the Attribute Table change to those most recently selected. Click 'SStatistics' in the Selection drop-down and write down the mean CPLAvg for this background selection. In the current example the value is 516 ppm-m.

12) Select a representative group of greater than 100 points on the other side of the plume as in step 11) and write down the mean SmCPLAvg for this background selection. In the current example the value is 489 ppm-m.

13) Subtract the average of the two background CPLs from the average CPL in the plume to obtain the CPL average above background across the plume (AvgPlumeCPL). For the current example, the result is 557.5 ppm-m.

14) Multiply the CPL average above background by the plume cross-section length to obtain the concentration area across the plume and from ground to the aircraft. For the current example the result is 557.5 ppm-m×12 m=6690 ppm-$m^2$.

15) Use the identify tool to determine the time for a point in the plume. UTC time in a format of 'hhmmss'.

16) Obtain wind speed and wind heading from a weather station near the plume location. In this case the wind vector was 1 mph from the N (180 deg).

17) Calculate the estimated flux perpendicular to the defined plume cross-section by multiplying the concentration-area by the wind speed and the sine of the difference between the cross-section heading and either the wind heading or the plume heading.

Using the wind heading (180 deg), the result for this example is: 6690 ppm-$m^2$×1 mph×1609 m/ml×sin(68-180)×(1/1E6 ppm)=9.98 $m^3$ STD/hr=352 SCFH. Using the plume heading (126 deg), the result for this example is 6690 ppm-$m^2$×1 mph×1609 m/ml×sin(68-126)×(1/1E6 ppm)=9.13 $m^3$ STD/hr=322 SCFH.

The process defined in this example calculated flux for the 500 SCFH release, outlined above, using 23 passes near and over the release, in slightly more than 1 hour. During that time the wind direction averaged slightly NNE (195.8 deg speed weighted) and wind speed averaged 2.7 mph. However, wind speed varied from 0 to 11 mph, wind heading varied from 135 to 235 deg, and plume heading varied from 126 to 237 deg.

Of the 23 passes, two (2) were flown under normal operating conditions (conical scan, 30 m swath) at a heading of 68 degrees, and 7 were flown at a heading of 40 deg. Of these 9 passes, one did not show a complete plume cross-section and one was at zero wind speed. In addition, 14 passes were flown at 113 or 83 deg headings with the conical scan turned off so that the ground pattern was a straight line; 8 of the 14 passes had an obstacle placed in the release path; 6 of 14 were flown 50 ft downwind of the release of which 1 was at zero wind speed; and one pass (1 mph, obstacle) showed no evidence of a plume. Four of the 14 passes were flown 100 ft downwind of which one (2 mph, obstacle) showed no evidence of a plume. Finally 4 of the 14 passes were flown 150 ft downwind, of which three were at zero wind speed and 1 (2 mph, no obstacle) showed no evidence of a plume. Given the varying winds, Table I (shown below) was used to determine whether instantaneous or average wind speeds and directions were more accurate, and whether flux may be better calculated using wind direction as measured by a weather station vs. that defined by the plume direction.

The estimates of methane flux from ANGEL airborne DIAL LIDAR measurements, using various wind speed and heading measurements, as well as repeat sampling with different cross-section lengths for several cases are shown in Table 1.

| Route | Local Time | Comment | Avg CPL across plume (STD ppm-m) | Avg Background CPL left of plume | Avg Background CPL right of plume | Cross-Plume Length (m) | Cross-Plume heading (deg) | Wind speed (mph) | Wind heading (deg) | Plume heading (deg) | Flight Heading (deg) | Average CPL Above Background across plume | Area Integrated Concentration Across plume (STD ppm-m^2) |
|---|---|---|---|---|---|---|---|---|---|---|---|---|---|
| | | | | | Conical Scan. 30 m Swath | | | | | | | | |
| 1409 | 14:55 | OK Plume X swath enough to calcula | 1060 | 489 | 516 | 12 | 68.5 | 1 | 180 | 126 | 68.5 | 558 | 6690 |
| 1409 | 14:57 | NG Plume 10 deg to flight | | Incomplete Plume Cross-Section | | | | 1 | 210 | | | | |
| 1657 | 14:59 | NG Plume apparent but zero wind | | Zero Wind | | | | 0 | | | | | |
| 1657 | 15:02 | OK Plume parallel swath | 786 | 379 | 383 | 8 | 125 | 6 | 225 | 220 | 220 | 405 | 3240 |
| 1657 | 15:04 | OK Plume parallel swath | 872 | 446 | 409 | 10 | 128 | 3 | 210 | 221 | 220 | 445 | 4445 |
| 1657 | 15:06 | OK Plume in path | 778 | 355 | 372 | 8 | 130 | 3 | 225 | 237 | 220 | 415 | 3316 |
| 1657 | 15:08 | Plume 27 deg to flight path | 716 | 419 | 433 | 6 | 103 | 11 | 210 | 193 | 220 | 290 | 1740 |
| 1657 | 15:10 | OK Plume in path | 1087 | 468 | 433 | 7.7 | 125 | 2 | 225 | 213 | 220 | 636 | 4898 |
| 1657 | 15:12 | Plume roughly 42 deg to flight path | 1034 | 398 | 425 | 4.5 | 92 | 6 | 180 | 182 | 220 | 623 | 2801 |
| | | | | | 0 Deg Conical Scan. 0 m Swath | | | | | | | | |
| 1610 | 15:15 | 50 feet downwind of release | 794 | 415 | 408 | 8.4 | 113 | 7 | 180 | 138 | 113 | 382 | 3211 |
| 1610 | 15:17 | 50 feet downwind of release | 493 | 419 | 406 | 116.1 | 113 | 2 | 150 | 140 | 113 | 80 | 9329 |
| 1628 | 15:20 | 100 feet downwind of release | 634 | 388 | 379 | 9.8 | 113 | 3 | 210 | 140 | 113 | 250 | 2453 |
| 1646 | 15:22 | 150 feet downwind of release | | Zero Wind | | | | 0 | | | | | |
| 1608 | 15:26 | 50 feet downwind of release | 1056 | 330 | 335 | 6.3 | 82.6 | 3 | 150 | 165.6 | 82.6 | 724 | 4558 |
| 1608 | 15:26 | 50 feel downwind of release | 1658 | 330 | 335 | 3.7 | 82.6 | 3 | 150 | 165.6 | 82.6 | 1326 | 4904 |
| 1626 | 15:29 | 100 feet downwind of release | 736 | 324 | 329 | 11.2 | 82.6 | 2 | 210 | 209.4 | 82.6 | 410 | 4590 |
| 1644 | 15:31 | 150 feet downwind of release | 897 | 324 | 329 | 8.6 | 82.6 | 2 | 210 | 209.4 | 82.6 | 571 | 4912 |
| 1610 | 15:33 | 50 feet downwind w/obstacle in flow | | No elevated CPL | | | | 2 | 235 | | 82.6 | | |
| 1628 | 15:37 | 100 feet downwind w/obstacle in flow | 935 | 365 | 368 | 9.5 | 113 | 0 | | 190 | 113 | 267 | 2638 |
| 1628 | 15:37 | 100 feet downwind w/obstacle in flow | 582 | 328 | 303 | 9.9 | 113 | 1 | 235 | 213.3 | 113 | 344 | 2579 |
| 1646 | 15:43 | 150 feet downwind w/obstacle in flow | 664 | 388 | 313 | 7.5 | 113 | 1 | 235 | 213.3 | 113 | | |
| 1644 | 15:47 | 50 feet downwind of release | | Zero Wind | | | | 0 | | | 113 | | |
| 1610 | 15:49 | 50 feet downwind w/obstacle in flow | 538 | 288 | 297 | 8.6 | 113 | 7 | 180 | 154 | 113 | 245 | 2108 |
| 1610 | 15:51 | 100 feet downwind w/obstacle in flow | | No elevated CPL | | | | 1 | 180 | | 113 | | |
| 1628 | 15:54 | 100 feet downwind w/obstacle in flow | | No elevated CPL | | | | 2 | 135 | | 113 | | |
| 1646 | | 150 feet downwind w/obstacle in flow | | No elevated CPL | | | | 0 | | | 113 | | |

| Route | Local Time | Comment | Sin (Wind heading minus Cross-plume heading) | Sin (Plume heading minus Cross-plume heading) | Flux using wind heading (SCFH) | Flux using plume heading (SCFH) | Avg Wind Speed (mph) | Flux using Wind heading & Avg Wind Speed (SCFH) | Flux using Plume heading & Avg Wind Speed (SCFH) | Avg Wind Heading (wtd by speed) | Sin (Wind heading minus Cross-plume heading) | Flux using Avg Wind Heading and Avg Wind Speed (SCFH) |
|---|---|---|---|---|---|---|---|---|---|---|---|---|
| | | | | | Conical Scan. 30 m Swath | | | | | | | |
| 1409 | 14:55 | OK Plume X swath enough to calcula | 0.9304 | 0.8434 | 353 | 320 | 2.72 | 961 | 871 | 195.8 | 0.7955 | 822 |
| 1409 | 14:57 | NG Plume 10 deg to flight | | | | | | | | | | |
| 1657 | 14:59 | NG Plume apparent but zero wind | 0.9848 | 0.9962 | 1087 | 1100 | 2.72 | 493 | 498 | 195.8 | 0.9444 | 473 |
| 1657 | 15:02 | OK Plume parallel swath | | | | | | | | | | |

| | | | | | | | | | |
|---|---|---|---|---|---|---|---|---|---|
| 1657 | 15:04 | OK Plume parallel swath | 0.9903 | 0.9986 | 750 | 756 | 680 | 686 | 195.8 | 0.9259 | 636 |
| 1657 | 15:06 | OK Plume in path | 0.9962 | 0.9563 | 563 | 540 | 510 | 490 | 195.8 | 0.9121 | 467 |
| 1657 | 15:08 | Plume 27 deg to flight path | 0.9563 | 1.0000 | 1039 | 1087 | 257 | 269 | 195.8 | 0.9988 | 268 |
| 1657 | 15:10 | OK Plume in path | 0.9848 | 0.9994 | 548 | 556 | 745 | 756 | 195.8 | 0.9444 | 714 |
| 1657 | 15:12 | Plume roughly 42 deg to flight path | 0.9994 | 1.0000 | 954 | 954 | 432 | 433 | 195.8 | 0.9711 | 420 |

0 Deg Conical Scan. 0 m Swath

| | | | | | | | | | | |
|---|---|---|---|---|---|---|---|---|---|---|
| 1610 | 15:15 | 50 feet downwind of release | 0.9205 | 0.4226 | 1175 | 539 | 456 | 210 | 195.8 | 0.9921 | 492 |
| 1610 | 15:17 | 50 feet downwind of release | 0.6018 | 0.4540 | 638 | 481 | 867 | 654 | 195.8 | 0.9921 | 1429 |
| 1628 | 15:20 100 feet downwind of release | 0.9925 | 0.4540 | 415 | 190 | 2.72 | 376 | 172 | 195.8 | 0.9921 | 376 |
| 1646 | 15:22 150 feet downwind of release | | | | | | | | | | |
| 1608 | 15:26 50 feet downwind of release | 0.9232 | 0.9925 | 717 | 771 | 2.72 | 650 | 699 | 195.3 | 0.9191 | 647 |
| 1608 | 15:26 50 feel downwind of release | 0.9232 | 0.9925 | 771 | 829 | 2.72 | 699 | 752 | 195.8 | 0.9191 | 696 |
| 1626 | 15:29 100 feet downwind of release | 0.7944 | 0.8007 | 414 | 417 | 2.72 | 563 | 568 | 195.8 | 0.9191 | 652 |
| 1626 | 15:29 100 feet downwind of release | 0.7944 | 0.8007 | 443 | 447 | 2.72 | 603 | 607 | 195.8 | 0.9191 | 697 |
| 1644 | 15:31 150 feet downwind of release | | | | | | | | | | |
| 1610 | 15:33 50 feet downwind w/obstacle in flow | | | | | | | | | | |
| 1628 | 15:37 100 feet downwind w/obstacle in flow | 0.8480 | 0.9839 | 127 | 147 | 2.72 | 346 | 401 | 195.8 | 0.9921 | 404 |
| 1628 | 15:37 100 feet downwind w/obstacle in flow | 0.8480 | 0.9839 | 124 | 144 | 2.72 | 338 | 392 | 195.8 | 0.9921 | 395 |
| 1646 | 15:43 150 feel downwind w/obstacle in flow | | | | | | | | | | |
| 1610 | 15:47 50 feet downwind w/obstacle in flow | 0.9205 | 0.6561 | 771 | 550 | 2.72 | 300 | 214 | 195.8 | 0.9921 | 323 |
| 1610 | 15:49 50 feet downwind w/obstacle in flow | | | | | | | | | | |
| 1628 | 15:51 100 feet downwind w/obstacle in flow | | | | | | | | | | |
| 1646 | 15:54 150 feel downwind w/obstacle in flow | | | | | | | | | | |
| | | | Average | 640 | 578 | | 546 | 510 | | | 583 |
| | | | Min | 124 | 144 | | 257 | 172 | | | 268 |
| | | | Max | 1175 | 1100 | | 961 | 871 | | | 1429 |
| | | | StDev | 312 | 301 | | 202 | 214 | | | 270 |

The general observation is that when instantaneous wind speeds are used, flux estimates tend to be higher than actual at higher wind speeds and lower than actual at lower wind speeds. This trend is removed when an average wind speed over the hour is used. Further, the standard deviation of the estimate is lower when the average wind speed is used.

The estimate of wind speed is the largest error component in estimation of flux measurements. The standard deviations using instantaneous wind heading vs. instantaneous plume heading are similar but lower when the average heading is used. Neither the cross-plume distance selected, nor the scanner set to ON/OFF appears to affect the ability of the system to estimate methane flux, so long as an elevated concentration of plume is observed in the data.

In all cases, the average flux over the multiple measurements is close to the metered release rate of 500 SCFH, with the largest 640 SCFH, the lowest 510 SCFH, and the average 571 SCFH. These results suggest that a good estimate of emitted is methane flux, or leak rate may be made using a DIAL sensor system, so long as (1) a plume of elevated concentration above background is observed in the data, (2) the plume is sufficiently defined in the data so that the entire cross-section of the plume may be sampled, and (3) wind speed is greater than 0 mph, preferably in the range of 2-10 mph. Where possible, it is advantageous to sample downwind of the source, while flying perpendicular to prevailing winds.

Although the examples described above are for an airborne DIAL system tuned to measure methane gas, the method may be extended to any other gas measurable by a DIAL system and to any measurement system that produces a vertical path concentration of that gas with sufficient horizontal resolution to adequately map the plume. For example, measurements may be made with an airborne spectrometer absorption system using reflected solar energy as a source.

Figure 5:
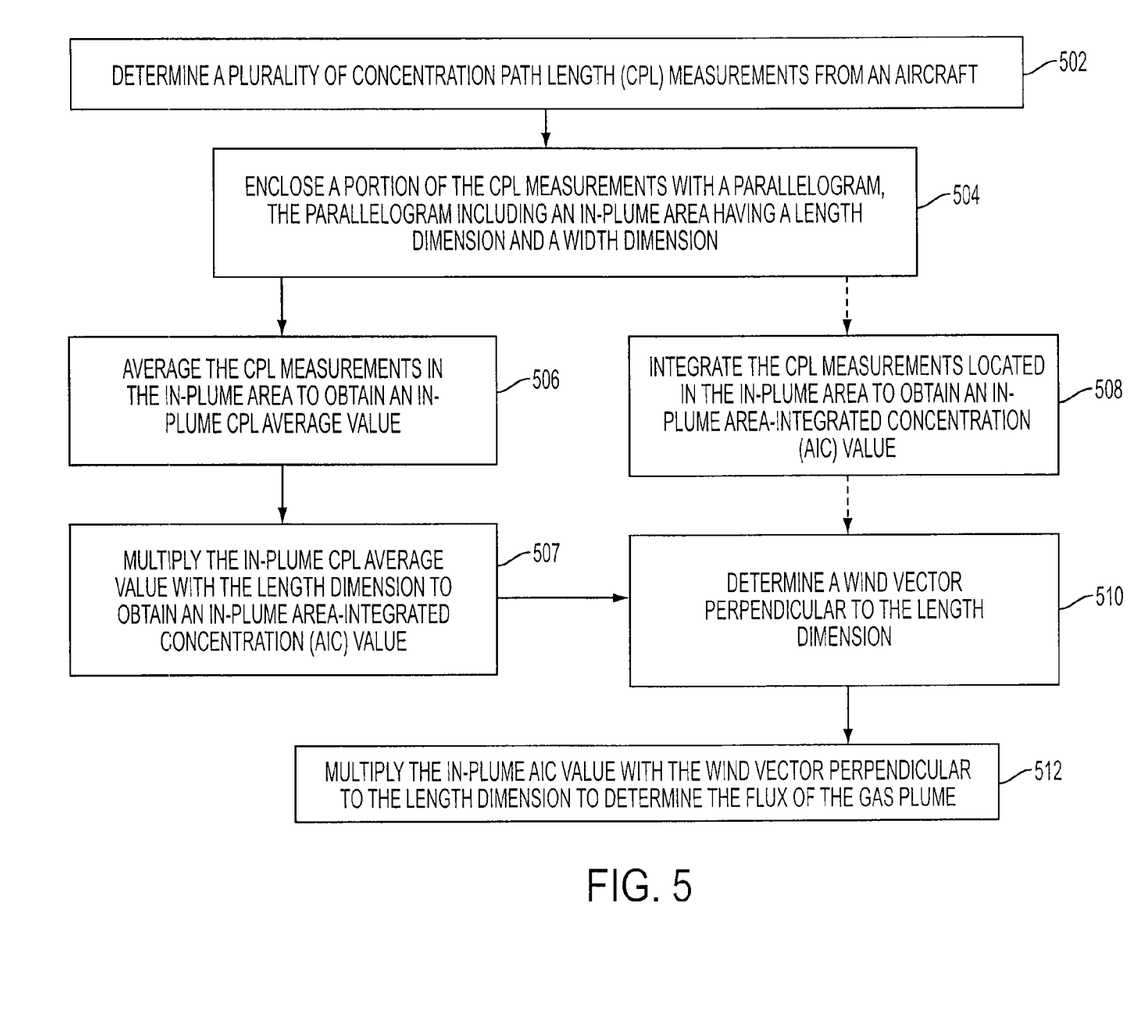
FIG. 5 is a flowchart illustrating a method for determining emission rate of a gas according to an exemplary embodiment of the present invention.

FIG. 5 is a flowchart illustrating an exemplary method for determining emission rate of a gas according to the present invention.

As shown at step 502, a plurality of concentration path length (CPL) measurements are determined from an aircraft. Determining the CPL measurements may include determining vertical CPL values in vertical paths from the airborne platform to an in-plume area. Further, each vertical CPL value may include a gas concentration value multiplied by a height dimension extending from the aircraft to the in-plume area.

As shown at step 504, a portion of the CPL measurements is enclosed with a parallelogram, such as the parallelogram enclosing in-plume area 402 shown at FIG. 4A. It is contemplated, however, that a portion of the CPL measurements may be enclosed using other shapes. The parallelogram may include an in-plume area having a length dimension and a width dimension. The length dimension may be oriented along a track of the aircraft.

As shown at steps 506, the CPL measurements in the in-plume area are averaged to obtain an in-plume CPL average value. As shown at step 507, the in-plume CPL average value obtained at step 506 may be multiplied with the length dimension to obtain an in-plume area-integrated concentration (AIC) value. Alternatively, as shown in phantom at step 508, the CPL measurements located in the in-plume area may be integrated to obtain an in-plume area-integrated concentration (AIC) value.

If the CPL measurements in the in-plume area are averaged, the vertical CPL measurements may include vertical CPL measurements obtained in at least one area adjacent to the in-plume area, such as adjacent areas 404 and 406 shown in FIG. 4A. If one adjacent area is used, the in-plume CPL average value may be determined by subtracting the average of the background vertical CPL measurements in either adjacent area 404 or 406 from the average of the vertical CPL measurements in the in-plume area 402. If both adjacent areas are used, the in-plume CPL average value may be determined by subtracting the average of the background vertical CPL measurements in both adjacent areas 404 and 406 from the average of the vertical CPL measurements in the in-plume area 402.

As shown at step 510, a wind vector perpendicular to the length dimension is determined. The wind vector perpendicular to the length dimension may be a vector component of a wind vector, determined from wind speed and heading. It is contemplated that the wind speed and heading may be determined, before, after or simultaneously with the in-plume CPL average value. It will be appreciated that if conical scan is used (scanner-on mode), the wind heading may be either plume heading or wind heading.

As shown at step 512, the in-plume AIC value determined at step 506, or alternatively at step 508, may be multiplied with the wind vector perpendicular to the length dimension to determine the flux of the gas plume.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for determining emission rate of a gas from a source comprising:
    a selector for designating an in-plume area extending across a plume of gas, the in-plume area including a length dimension greater than a width dimension,
    a processor for determining an area-integrated concentration value for the in-plume area,
    a wind vector received by the processor, and
    the processor for determining the emission rate of the gas based on the area-integrated concentration value and a vector component of the wind vector,
    the area-integrated concentration value is based on a plurality of concentration path length (CPL) measurements obtained by an airborne platform,
    the selector includes a drawing tool for drawing a polygon to surround the in-plume area, and
    the polygon includes a rectangle or a parallelogram having the length dimension oriented along a flight path of the airborne platform.

2. The system of claim 1 wherein
    the vector component is a vector perpendicular to the length dimension of the in-plume area.

3. The system of claim 2 wherein
    the wind vector received by the processor includes heading and magnitude of a wind or the plume of gas.

4. The system of claim 1 wherein
    the plurality of CPL measurements includes vertical CPL measurements in vertical paths from the airborne platform to the in-plume area, and
    the processor is configured to determine the area-integrated concentration value by integrating the vertical CPL measurements located in the in-plume area.

5. The system of claim 1 wherein
    the plurality of CPL measurements includes vertical CPL measurements in vertical paths from the airborne platform to the in-plume area, and
    the processor configured to obtain the area-integrated concentration value by averaging the vertical CPL measurements located in the in-plume area to produce an in-plume CPL average value and multiplying the in-plume CPL average value by the length dimension of the in-plume area.

6. The system of claim 5 wherein
the vertical CPL measurements include background vertical CPL measurements obtained in a first area adjacent to the in-plume area, and
the processor is configured to determine the in-plume CPL average value by subtracting the average of the background vertical CPL measurements in the first area from the average of the vertical CPL measurements in the in-plume area.

7. The system of claim 6 wherein
the vertical CPL measurements include background vertical CPL measurements obtained in a second area adjacent to the in-plume area,
the in-plume area is sandwiched between the first and second areas, and
the processor is configured to determine the in-plume CPL average value by subtracting the average of the background vertical CPL measurements in the first and second areas from the average of the vertical CPL measurements in the in-plume area.

8. The system of claim 1 wherein
the gas includes methane.

9. The system of claim 1 wherein
the CPL measurements are obtained by a differential absorption lidar (DIAL) system residing in the airborne platform.

10. The system of claim 1 wherein
the CPL measurements are obtained by a spectrometer absorption system residing in the airborne platform using reflected energy as a source.

11. A system for determining emission rate of a gas from a source comprising:
a selector for designating an in-plume area extending across a plume of gas, the in-plume area including a length dimension greater than a width dimension,
a processor for determining an area-integrated concentration value for the in-plume area,
a wind vector received by the processor, and
the processor for determining the emission rate of the gas based on the area-integrated concentration value and a vector component of the wind vector,
the area-integrated concentration value is based on a plurality of concentration path length (CPL) measurements obtained by an airborne platform, and
the vector component is a vector perpendicular to the length dimension of the in-plume area,
wherein the in-plume area includes CPL measurements above a predetermined threshold value.

12. A system for determining flux of a gas plume comprising:
a differential absorption LIDAR (DIAL) for determining a plurality of concentration path length (CPL) measurements,
a selector for designating an in-plume area extending across the plume of gas, the in-plume area including length and width dimensions and a portion of the CPL measurements,
a processor for averaging the portion of the CPL measurements to obtain an in-plume CPL average value, and
the processor for determining the flux of the gas plume by multiplying the in-plume CPL average value with the length dimension and a wind vector perpendicular to the length dimension,
the DIAL is located in an airborne platform, and
the CPL measurements include vertical CPL values, each vertical CPL value comprising a gas concentration value multiplied by a height dimension extending from the airborne platform to the in-plume area,
wherein the selector includes a drawings tool for drawing a rectangle or a parallelogram to surround the in-plume area, and
the length dimension is oriented along a track made by the airborne platform.

13. The system of claim 12 wherein
the wind vector includes wind heading and magnitude values of either a wind adjacent to the in-plume area or a wind of the gas plume.

14. A system for determining emission rate of a gas from a source comprising:
a selector for designating an in-plume area extending across a plume of gas, the in-plume area including a length dimension greater than a width dimension,
a processor for determining an area-integrated concentration value for the in-plume area,
a wind vector received by the processor, and
the processor for determining the emission rate of the gas based on the area-integrated concentration value and a vector component of the wind vector;
wherein the in-plume area is selected as a rectangle or a parallelogram having the length dimension oriented along a flight path of the airborne platform, and
the area-integrated concentration value is based on a plurality of concentration path length (CPL) measurements obtained by the airborne platform.

15. The system of claim 14 wherein
the width dimension is unity (1), formed by a straight line illumination on a swath of ground.

16. The system of claim 14 wherein
the width dimension is a function of a conical scan width illuminating a swath of ground.

* * * * *